United States Patent [19]

Laliberté

[11] Patent Number: 4,755,733

[45] Date of Patent: Jul. 5, 1988

[54] BATTERY CHARGING AND CYCLING DEVICES

[75] Inventor: Lambert Laliberté, St-Bruno-de-Montarville, Canada

[73] Assignee: IRSST Institut de Recherche en Santé et en Sécurité du Travail du Québec, Montreal, Canada

[21] Appl. No.: 10,784

[22] Filed: Feb. 3, 1987

[51] Int. Cl.[4] .............................................. H02J 7/00
[52] U.S. Cl. ......................................... 320/15; 320/6; 320/14; 320/23; 320/38; 320/48
[58] Field of Search .................. 320/6, 14, 15, 17, 23, 320/38, 48, 2

[56] References Cited

U.S. PATENT DOCUMENTS

| | | | |
|---|---|---|---|
| 3,626,270 | 12/1971 | Burkett et al. | 320/35 |
| 3,735,232 | 5/1973 | Fister | 320/2 |
| 3,950,689 | 4/1976 | Jamison | 320/5 |
| 4,006,396 | 2/1977 | Bogut | 320/2 |
| 4,303,876 | 12/1981 | Kelly, III et al. | 320/2 |
| 4,342,954 | 8/1982 | Griffith | 320/14 |
| 4,456,869 | 6/1984 | Schub | 320/38 |

*Primary Examiner*—Patrick R. Salce
*Assistant Examiner*—Anita M. Ault
*Attorney, Agent, or Firm*—Robic, Robic & Associates

[57] ABSTRACT

A cycling device for conditioning battery cells of different types. A selector allows an operator to select the type of the cells to be conditioned. The amplitudes of trickle, discharge and charging currents are automatically selected in response to an output signal from the cell type selector. A control circuit determines the sequence of occurence of the trickle, discharge and charging currents and produces discharge and charge logic conditions, which control circuit includes a timer which delivers a clock signal and which interrupts the charging current after the same has been supplied to the battery cells during a predetermined period of time. Proper discharge operation of the cycling device is indicated only when both the discharge logic conditions are present and the discharge current is detected, while proper charge operation is indicated only when, simultaneously, the charge logic conditions are present, the charging current is detected, and the clock signal is produced by the timer. A detector indicates opening of the circuit through which flow the trickle, discharge and charging currents. The battery cells are so conditioned that at least some of the problems associated with their general use with lack of care, for example crystal growth, lost of internal contact with the sintered plates, etc. are cancelled. The original characteristics of the cycling device can also be applied to a battery cell charger.

22 Claims, 4 Drawing Sheets

BATTERY CHARGING AND CYCLING DEVICES

BACKGROUND OF THE INVENTION

1. Field of the Invention

The present invention relates to improved battery cell charging and cycling devices.

The term "cycling device" designates in the present specification a device which conditions battery cells by at least sequentially discharging and charging the same.

2. Brief Description of the Prior Art

U.S. Pat. No. 4,342,954 (GRIFFITH) issued on Aug. 3, 1982 describes a battery conditioning apparatus comprising a first electronic circuit which causes serially interconnected battery cells to supply a discharge current until the voltage across these cells reaches a predetermined lower limit. Such a discharge mode of the battery conditioning apparatus is indicated through a first light-emitting diode (LED).

After the voltage across the battery cells to be conditioned has reached the predetermined lower limit, a second electronic circuit supplies a constant charging current to the battery cells during a predetermined period of time. Such a charge mode of the conditioning apparatus is indicated through a second LED.

A first disadvantage of the battery conditioning apparatus of U.S. Pat. No. 4,342,954 is that it is only designed for use with a specific type of battery cells. More particularly, the conditioning apparatus does not provide for adjustment of the discharge and charging currents in relation to the type of battery cell to be conditioned. Even if the charging current can be varied through a potentiometer, each adjustment of the amplitude of the charging current requires accurate measurement of the latter current.

Another drawback of the battery conditioning apparatus of U.S. Pat. No. 4,342,954 is that the first and second LED's can indicate the discharge and charge modes even if the discharge and charging currents are interrupted and the timing circuit determining the time of charge of the battery cells is malfunctioning.

OBJECT OF THE INVENTION

An object of the present invention is therefore to provide battery cell charging and cycling devices which eliminate the above discussed drawbacks of the prior art.

SUMMARY OF THE INVENTION

In accordance with a first aspect of the present invention, there is provided a battery cell charging device comprising means for connecting battery cells of different types thereto, and means for generating charging currents of different amplitudes. Each charging current amplitude is suitable to charge one type of battery cell. The battery cell charging device further includes means for selecting the type of at least one battery cell of one type to be charged, said at least one battery cell being connected to the charging device through the connecting means. The cell type selecting means comprises means for producing an output signal indicative of the selected type of battery cell, while the charging current generating means is provided with means for automatically selecting, in response to the indicative output signal from the cell type selecting means, one of the charging currents having the amplitude suitable to charge the selected type of battery cell, as well as means for supplying the selected charging current to said at least one battery cell in order to charge the same.

Preferably, timing means are also provided for interrupting the selected charging current after the latter has been supplied to said at least one battery cell during a predetermined period of time. The amplitude of the selected charging current and the predetermined period of time are so adjusted that said at least one battery cell is fully charged at the end of the predetermined period of time.

Advantageously, a plurality of serially interconnected battery cells of one type are simultaneously charged.

In accordance with a second aspect of the present invention, there is provided a cycling device for conditioning battery cells, comprising means for connecting battery cells of different types thereto, load means for causing discharge currents of different amplitudes, each discharge current amplitude being suitable to discharge one type of battery cell, and means for generating charging currents of different amplitudes, each charging current amplitude being suitable to charge one type of battery cell. The cycling device further includes means for selecting the type of at least one battery cell of one type to be conditioned, said at least one battery cell being connected to the cycling device through the connecting means. The cell type selecting means is provided with means for producing an output signal indicative of the selected type of battery cell. The load means includes means for automatically selecting, in response to the indicative output signal from the cell type selecting means, one of the discharge currents having the amplitude suitable to discharge a selected type of battery cell, and means for causing said at least one battery cell to supply the selected discharge current in order to discharge said at least one battery cell. The charging current generating means comprises means for automatically selecting, in response to the indicative output signal from the cell type selecting means, one of the charging currents having the amplitude suitable to charge the selected type of battery cell, and means for supplying the selected charging current to said at least one battery cell to charge the latter. Control means controls the load means and the charging current generating means to cause in sequence supply by said at least one battery cell of the selected discharge current and supply of the selected charging current to said at least one battery cell.

In accordance with a preferred embodiment of the present invention, this cycling device further comprises means for generating trickle currents of different amplitudes, each trickle current amplitude being suitable to hold the charge of one type of battery cell. It should be pointed out that, in the present specification, the expression "trickle current" designates a low electric direct current supplied to battery cells in order to hold their electric charge. These trickle current generating means includes means for automatically selecting, in response to the indicative output signal from the cell type selecting means, one of the trickle currents having the amplitude suitable to hold the charge of the selected type of battery cell, and means for supplying the selected trickle current to said at least one battery cell to hold the charge of the latter. The control means then comprises means for controlling the trickle current generating means so as to cause in sequence supply of the selected trickle current to said at least one battery cell, supply by said at least one battery cell of the selected discharge current, and supply to the selected charging current to said at least one battery cell.

The charging and cycling devices in accordance with the present invention can therefore charge or cycle battery cells of different types. The charging current and, in the case of the cycling device, the trickle and discharge currents are automatically selected in accordance with the selected type of battery cell, whereby each type of battery cell can be efficiently and appropriately charged or conditioned.

In accordance with a third aspect of the invention, there is provided a battery cell charging device including means for connecting at least one battery cell to the charging device, means for supplying a charging current to said at least one battery cell in order to charge the latter, and timing means for interrupting the charging current after this current has been supplied to said at least one battery cell during a predetermined period of time. The timing means includes means for producing a first output signal indicating operation thereof. Detecting means detects the charging current and produces a second output signal upon detection of this charging current. Indicating means indicates proper battery cell charging operation of the charging device only in response to both the first and second output signals, so that proper battery cell charging operation is indicated only when the timing means are operating and the charging current is detected.

In accordance with a fourth aspect of the present invention, there is provided a cycling device for conditioning at least one battery cell, comprising means for connecting said at least one battery cell to the cycling device, load means for causing said at least one battery cell to supply a discharge current so as to discharge the same, and means for supplying a charging current to said at least one battery cell in order to charge the latter. Control means controls the load means and the charging current supplying means to cause in sequence supply by said at least one battery cell of the discharge current and supply of the charging current to said at least one battery cell. The control means comprises means for producing discharge logic conditions to cause supply by said at least one battery cell of the discharge current, means for producing charge logic conditions to cause supply of the charging current to said at least one battery cell, and timing means for interrupting the charging current after this current has been supplied to said at least one battery cell during a predetermined period of time. These timing means includes means for producing a first output signal indicating operation thereof. The cycling device further comprises means for detecting the discharge current and for producing a second output signal upon detection of this discharge current, and means for detecting the charging current and for producing a third output signal upon detection of this charging current. Indicating means indicates proper battery cell discharge operation of the cycling device only when both the second output signal and the discharge logic conditions are produced, while other indicating means indicates proper battery cell charge operation of the cycling device only when the first output signal, the third output signal, and the charge logic conditions are produced simultaneously.

Indication of the charge and discharge modes is therefore enabled only if at least two conditions are met, which conditions are selected to prevent false indication of these two modes.

According to another aspect of the present invention, there is provided a battery cell charging device comprising means for connecting at least one battery cell to the charging device, means for supplying a charging current to said at least one battery cell through a charge circuit in order to charge said at least one battery cell, and means for detecting opening of the charge circuit. The detecting means comprises means for delivering an output signal upon opening of the charge circuit. An indicator is responsive to the output signal from the detecting means to indicate opening of the charge circuit.

According to a further aspect of the present invention, there is provided a cycling device for conditioning at least one battery cell, comprising means for connecting said at least one battery cell to the cycling device, and means for causing in sequence supply through an electric circuit of a discharge current by said at least one battery cell in order to discharge the same and supply through the electric circuit of a charging current to said at least one battery cell in order to charge the latter. Detecting means detects opening of the electric circuits and delivers an output signal upon opening of this circuit, while an indicator is responsive to the output signal from the detecting means to indicate opening of the electric circuit.

This cycling device may further comprise means for supplying through the electric circuit a trickle current to said at least one battery cell in order to hold the charge of the same, said trickle, discharge and charging currents being supplied in sequence.

Detection of opening, in the case of a charging device, of the charge circuit and, in the case of a cycling device, of the electric circuit through which flows the trickle, discharge and charging currents, presents the advantage of immediately indicating to the operator for example unappropriate installation of the battery cells, severing of an overcurrent protective fuse, breaking or disconnection of an electric wire, etc.

BRIEF DESCRIPTION OF THE DRAWINGS

The objects, advantages and other features of the present invention will become more apparent upon reading of the following non-restrictive description of a preferred embodiment of an automatic cycling device for conditioning Nickel-Cadmium battery cells, given with reference to the accompanying drawings in which.

DETAILED DESCRIPTION OF THE PREFERRED EMBODIMENT

Although the following description relates specifically to a cycling device for conditioning battery cells, it will appear to those skilled in the art that the original characteristics of the cycling device can be incorporated in a battery cell charging device (battery charger).

Figure 1:
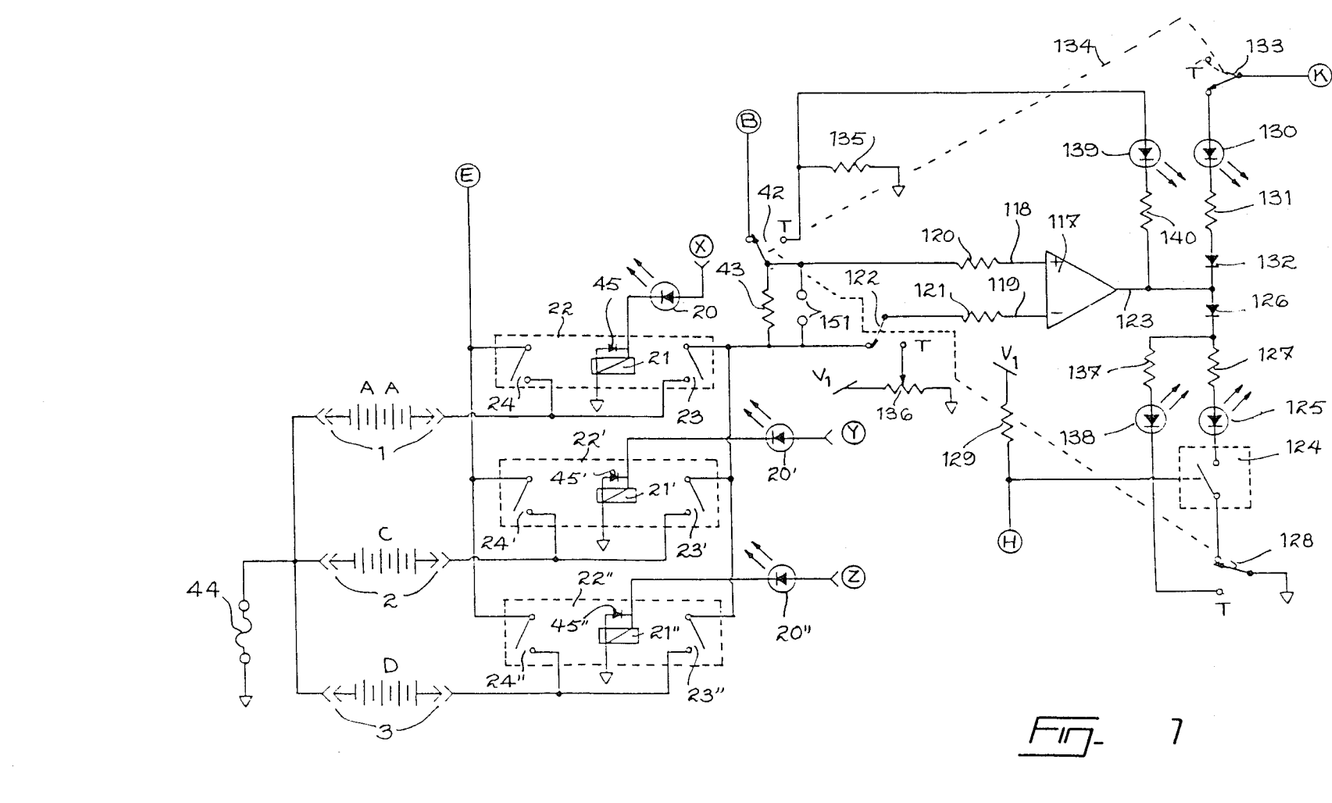
FIG. 1 is a first portion of the circuit of the automatic cycling for conditioning Nickel-Cadmium (Ni-Cd) battery cells.

Referring now to FIG. 1 of the attached drawings, the cycling device comprises conventional connectors such as 1, 2 and 3 provided for connection to the cycling device of the Ni-Cd battery cells to be conditioned. As an example, the connectors 1 are designed to receive four serially interconnected cells of the type AA, the connectors 2 are designed to receive four serially interconnected cells of the type C, while the connectors 3 are designed to receive four serially interconnected cells of the type D.

Figure 2:
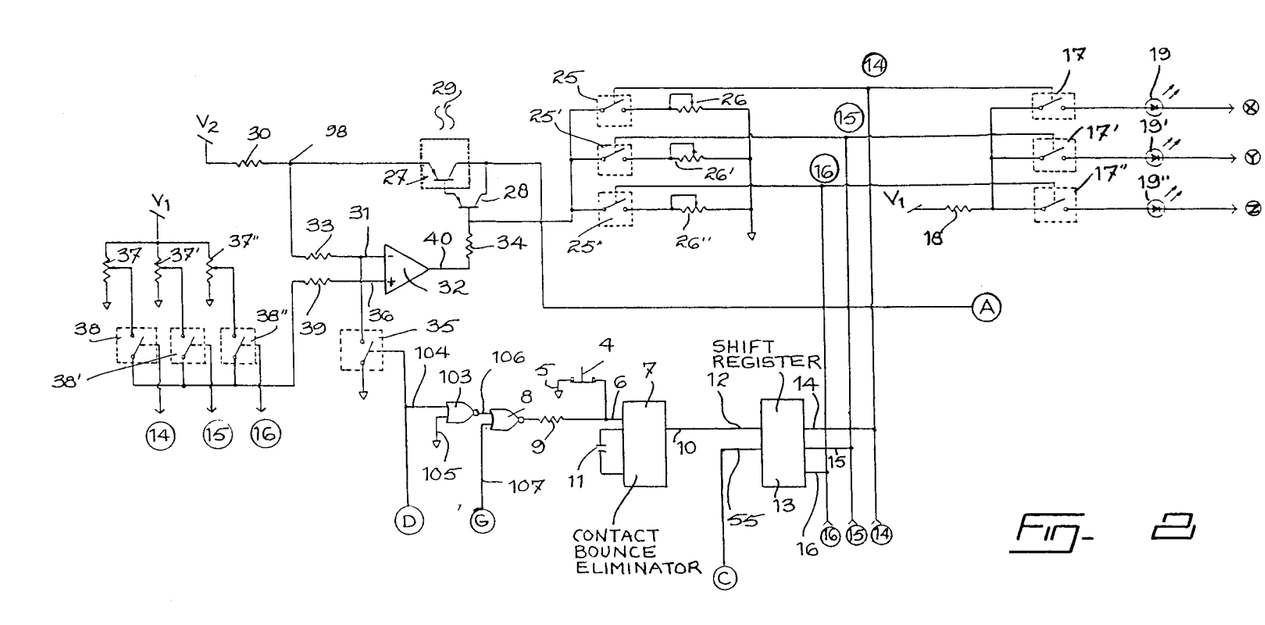
FIG. 2 is a second portion of the circuit of the automatic cycling device.

A selection of the type of battery cells to be conditioned is carried out through a push button 4 shown in FIG. 2. This push button 4 normally connects to the ground 5 of the electronic circuit of the cycling device an input 6 of a contact bounce eliminator 7.

When the output of a NOR gate 8 connected to the input 6 of the contact bounce eliminator 7 through a resistor 9 delivers a high logic level signal, each time the push button 4 is depressed the input 6 is disconnected from the ground 5 and a positive pulse is produced on the input 6. In response to the leading edge of each pulse on its input 6, the eliminator 7 supplies a pulse on its output 10 after a certain time delay following this leading edge, which delay is determined by the capacitance of a capacitor 11.

Of course, the function of the contact bounce eliminator 7 is to prevent supplying of pulses to an input 12 of a shift register 13, caused by bouncing of the contacts of the push button 4.

Each pulse on the output 10 of the contact bounce eliminator 7 is therefore supplied to the input 12 of the shift register 13. In response to the pulses on its input 12, the shift register 13 delivers cyclically on its outputs 14, 15 and 16 a high logic level signal. More specifically, in response to each pulse on its input 12 starting from its reset state during which no signal is produced on the outputs 14 to 16, the register 13 successively produces a high logic level signal on its output 14, transfers the high level signal from its output 14 to its output 15, transfers the high level signal from its output 15 to its output 16, and returns the high level signal on its output 14. This cycle can be repeated at will through depression of the push button 4. A high logic level signal on the output 14 corresponds to selection of cell type AA, a high logic level signal on the output 15 of the shift register 13 corresponds to selection of cell type C, while a high logic level signal on the output 16 corresponds to selection of battery cell type D. The type of battery cell to be conditioned is therefore selected through successive depressions of the push button 4.

Depending on which output 14, 15 or 16 the high logic level signal is present, one of the electronic switches 17, 17' and 17" will be closed. Indeed, the electronic switches 17, 17' and 17" are designed to close their contacts upon supplying on their control input of a high logic level signal. It should be pointed out here that all the electronic switches, such as 17, 17' and 17", forming part of the electronic circuit of FIGS. 1 to 4 can be of the type CD 4066 manufactured and commercialized by the company MOTOROLA.

Upon closure of the contacts of one of the switches 17, 17' and 17" a direct current produced by a positive direct current source voltage $V_1$ is supplied through a resistor 18, through the closed switch 17, 17' or 17", through a corresponding LED 19, 19' or 19", through a corresponding connection point X, Y or Z, and through a corresponding LED 20, 20' or 20" (see FIG. 1), to a coil 21, 21' or 21" of a corresponding relay 22, 22' or 22". Upon energizing of its coil 21, each relay 22 closes its contacts 23 and 24.

The function of the LED's 19, 19', 19", 20, 20' and 20" is of course to indicate the selected type of battery cells. The three LED's 19, 19' and 19" are preferably disposed close to the push button 4 while the LED's 20, 20' and 20" are advantageously mounted near the connectors 1, 2 and 3 respectively.

Free wheeling diodes 45, 45' and 45" are connected in parallel with the coils 21, 21' and 21" of the relays 22, 22' and 22", respectively, to protect these coils as well as the diodes 19, 19' and 19" and the electronic switches 17, 17' and 17" against over-voltages produced in response to a sudden interruption of the current in the coils 21, 21' and 21".

The high logic level signal on one of the outputs 14 to 16 also closes a corresponding electronic switch 25, 25' or 25". The closure of the contacts of one of the switches 25, 25' and 25" interconnects a corresponding potentiometer 26, 26' or 26" between the base of a transistor 28 and the ground of the electronic circuit.

As can be seen in FIG. 2, another transistor 27 along with the transistor 28, both of the type PNP, are mounted in a Darlington circuit. As a relatively high current can be conducted through the emitter-collector junction of the transistor 27, the latter is mounted on an heat sink as shown at 29. A positive direct current source voltage $V_2$ is connected to the emitter of the transistor 27 through a resistor 30, while the voltage on the emitter of the transistor 27 is applied to the inverting input 31 of a comparator 32 through a resistor 33. The comparator 32 has an output 40 connected through a resistor 34 to the base of the transistor 28. The base of the transistor 27 is connected to the emitter of the transistor 28 while the collectors of the transistors 27 and 28 are interconnected together.

As will be seen in greater detail hereinafter, the transistors 27 and 28 along with the comparator 32 and the resistor 30 constitute an adjustable constant direct current source with feedback.

For a proper operation of the current source, the voltage $V_2$ has to be lower than the voltage $V_1$. As an example, the voltage $V_1$ can be 12 volts while the voltage $V_2$ can be 10 volts. It is also important that the voltage $V_2$ be independent of the voltage $V_1$ to prevent fluctuations thereof which would cause fluctuations in the current supplied through the adjustable constant direct current source.

In the "trickle" mode of the cycling device, an electronic switch 35 is closed so that the inverting input 31 of the comparator 32 is grounded, as will also be explained in the following description.

The high logic level signal on one of the outputs 14 to 16 is also supplied to the control input of the corresponding one of the electronic switches 38, 38' and 38" in order to close this corresponding switch 38, 38' or 38". A positive direct current (dc) voltage is produced by the voltage $V_1$ on a non-inverting input 36 of the comparator 32 through the closed switch 38, 38' or 38", through the corresponding one of potentiometers 37, 37' and 37", and through a resistor 39. As the inverting input 31 of the comparator 32 is grounded while the non-inverting input 36 is supplied with a positive dc voltage, the output 40 of the comparator 32 delivers a high logic level signal (voltage $V_1$). A base current then flows through the base of the transistor 28, which base current has an amplitude determined by the resistance of the potentiometer 26, 26' or 26" corresponding to the switch 25, 25' or 25" which is closed. In response to this base current, the transistors 27 and 28 generate a trickle current supplied through the resistor 30, a connection point A, a line 41 (FIG. 3), a connection point B, switch contacts 42 (FIG. 1), a resistor 43 and the closed contacts 23, 23' or 23" of the energized relay 22, 22' or 22", to the battery cells of the selected type AA, C or D. A fuse 44 illustrated in FIG. 1 protects the battery cells against an overcurrent supplied thereto by the constant current source (transistors 27 and 28, resistor 30 and comparator 32), and against supplying of a too high current.

As the amplitude of the trickle current is proportional to the amplitude of the base current of the transistor 28 which is determined by the resistance of the potentiometer 26, 26' or 26" corresponding to the closed switch 25, 25' or 25", it is possible to adjust the resistance of the potentiometers 26, 26' and 26" so that a trickle current of appropriate amplitude is supplied to the battery cells according to the selected cell type AA, C or D. Automatic selection of the trickle current is then made through control of the switches 25, 25' and 25" by the high logic level signal on the outputs 14 to 16 of the register 13.

Figure 4:
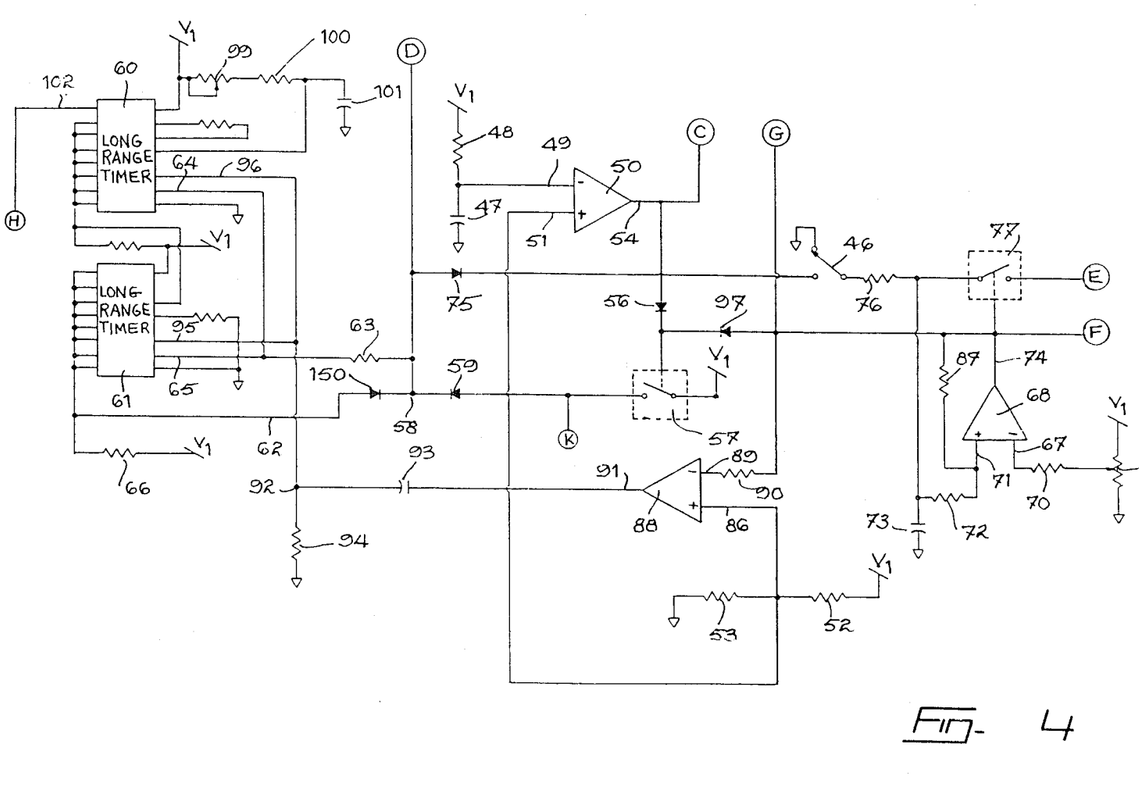
FIG. 4 is a fourth portion of the circuit of the cycling device.

Upon energizing of the cycling device, the dc voltage $V_1$ charges a capacitor 47 through a resistor 48 (FIG. 4). The dc voltage across the capacitor 47 is applied to the inverting input 49 of a comparator 50. At the same time, a voltage produced by the dc voltage $V_1$ through a voltage divider formed by two resistors 52 and 53 is applied to the non-inverting input 51 of the comparator 50. Therefore, upon energizing of the cycling device, the comparator 50 supplies on its output 54 a high logic level signal. When the voltage across the capacitor 47 reaches the voltage applied on the non-inverting input 51, a transition high logic level-low logic level is produced on the output 54 of the comparator 50. This high-to-low transition on the output 54 is transmitted through a connection point C to a reset input 55 of the shift register 13 (see FIG. 2). The shift register 13 is then reset and takes its reset state. Desired selection of the type of battery cell to be conditioned can thereafter be carried out through depression of the push button 4 as explained hereinabove.

The signal on the output 54 of the comparator 50 is also transmitted through a diode 56 to the control input of an electronic switch 57. Consequently, upon energizing of the cycling device, the high logic level signal on the output of the comparator 50 closes the switch 57 through which the voltage $V_1$ is transmitted at circuit point 58 through a diode 59. Upon occurence of the high-to-low transition on the comparator output 54, the switch 57 is opened so that a transition high logic level - low logic level is produced at circuit point 58. A positive pulse is therefore produced at point 58 upon energizing of the cycling device.

The positive pulse at circuit point 58 is transmitted through a resistor 63 to inputs 64 and 65 of two long range timers 60 and 61 so as to stop counting of the latter. After stopping of such counting, a high logic level signal produced by the voltage $V_1$ through a resistor 66 appears on an output line 62 of these timers. A high logic level signal is therefore present at circuit point 58 and is transmitted through a connection point D to the control input of the electronic switch 35 (FIG. 2) to close the same. The inverting input 31 of the comparator 32 is then grounded so as to define the above defined trickle mode of the cycling device during which a trickle current is supplied to the battery cells to be conditioned.

The long range timers 60 and 61 are integrated circuits identified by the number 2240, manufactured and commercialized by the company EXAR.

Upon energizing of the cycling device, the inverting input 67 (FIG. 4) of a comparator 68 is supplied by a dc voltage generated by the voltage $V_1$ through a potentiometer 69 connected to the inverting input 67 through a resistor 70. The non-inverting input 71 of the comparator 68 is ground through a resistor 72, another resistor 76 and a push button switch 46, so that a low logic level signal is produced on the output 74 of the comparator 68. A feedback resistor 87 interconnects the output 74 and the non-inverting input 71 of the comparator 68.

The cycling device remains in its trickle mode until the push button 46 is depressed. Upon depression of the push button 46, the high logic level signal present at circuit point 58 is transmitted through a diode 75, the push button 46, the resistor 76, the resistor 72 and the capacitor 73 to the non-inverting input 71 of the comparator 68. A positive dc voltage therefore appears on the non-inverting input 71, which voltage has an amplitude which increases as the capacitor 73 is charged. As soon as the voltage on the non-inverting input 71 is higher than that on the inverting input 67, a high logic level signal is produced on the output 74 of the comparator 68.

The high logic level signal on the output 74 is transmitted to the control input of an electronic switch 77 to close the same. The voltage across the serially interconnected battery cells to be conditioned is transmitted through the closed contacts 24, 24' or 24", a connection point E, the closed switch 77, the resistor 72 and the capacitor 73 to the non-inverting input 71 of the comparator 68 after the push button 46 has returned to its open position. A function of the capacitor 73 is to prevent transients in the voltage from the battery cells.

The high logic level signal on the output 74 of the comparator 68 is also supplied through a diode 97 to the control input of the electronic switch 57 to close the same. The voltage $V_1$ is then transmitted through the switch 57 and the diode 59 to the circuit point 58. The high logic level signal at point 58 is applied to the inputs 64 and 65 of the timers 60 and 61 through the resistor 63 to lock these timers in their reset state, and to the control input of the electronic switch 35 to lock the latter in its closed state and keep the input 31 of the comparator 32 grounded.

Figure 3:
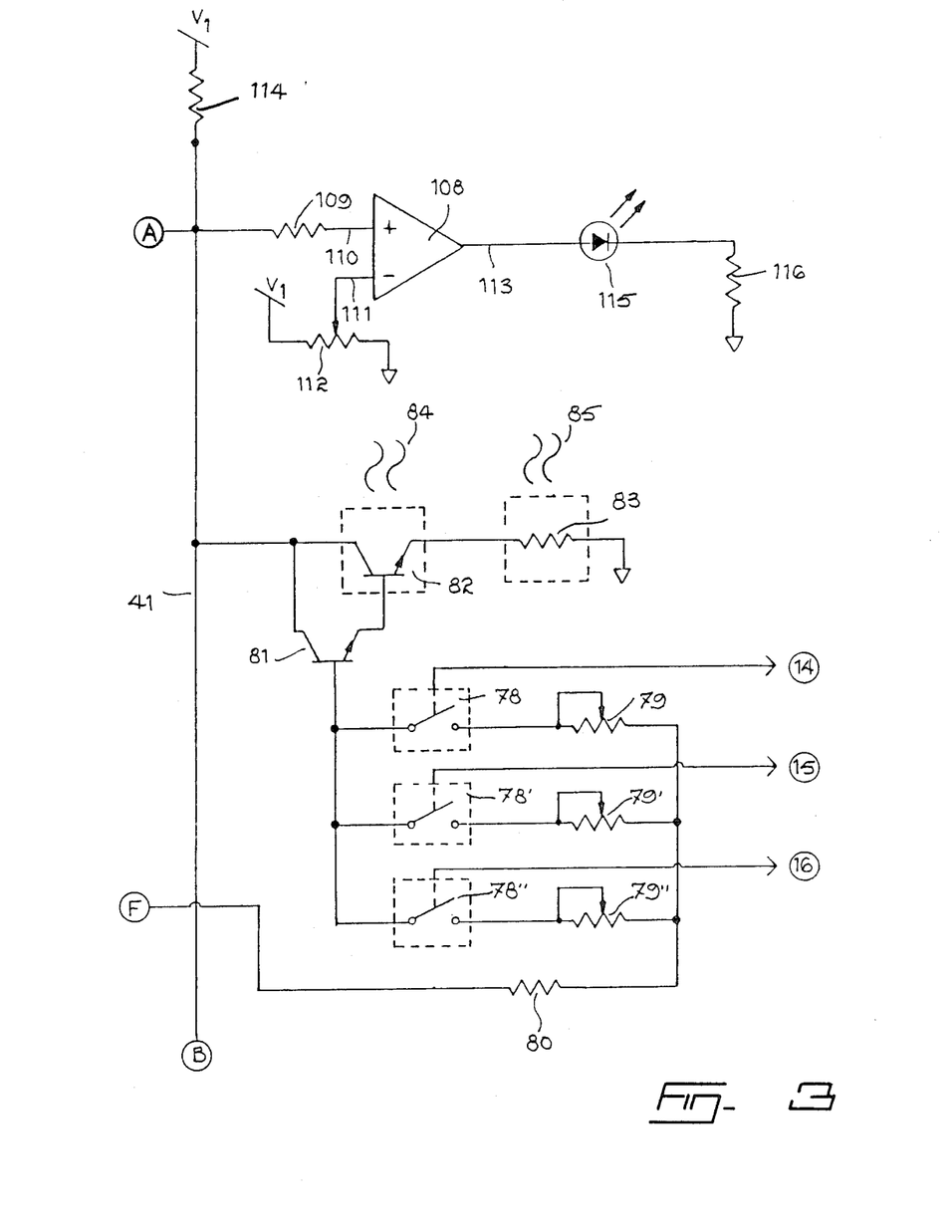
FIG. 3 is a third portion of the circuit of the cycling device.

The high logic level signal on the output 74 of the comparator 68 is further transmitted through a connection point F to an automatic discharge current selector (FIG. 3). Such a selector is formed by three electronic switches 78, 78' and 78", three potentiometers 79, 79' and 79", and a resistor 80, and is associated with two NPN transistors 81 and 82, and a resistor 83. As can be seen on FIG. 3, the transistor 82 and the resistor 83 are each mounted on an heat sink as indicated at 84 and 85. The three electronic switches 78, 78' and 78" are controlled by the outputs 14 to 16 of the shift register 13. Depending on the selected type of battery cell, a corresponding one of the electronic switches 78, 78' and 78" is closed. The high logic level signal on the output 74 of the comparator 68 (FIG. 4) therefore supplies a current to the base of the transistor 81 (FIG. 3) through the connection point F, the resistor 80, the potentiometer 79, 79' or 79" corresponding to the closed switch 78, 78' or 78", and said closed switch 78, 78' or 78".

As can be seen on FIG. 3, the transistors 81 and 82 are interconnected in a Darlington circuit. More specifically, the collectors of the transistors 81 and 82 are interconnected together, and the emitter of the transistor 81 is connected to the base of the transistor 82. The resistor 83 is connected between the ground of the circuit of the cycling device and the emitter of the transistor 82. Supply of a base current to the transistor 81 establishes a discharge current through the transistors 81 and 82 and the resistor 83, which discharge current is supplied by the battery cells to be conditioned through the closed contacts 23, 23' or 23'', the resistor 43, the switch contacts 42, the connection point B and the line 41 (see FIGS. 1 and 3). Of course, adjustment of the amplitude of the discharge current for the different types of battery cell is carried out through adjustment of the resistances of the potentiometers 79, 79' and 79'' which control the amplitude of the base current supplied to the transistor 81, the discharge current being proportional to this base current. Selection of the amplitude of the discharge current in relation of the type of battery cell to be conditioned is therefore automatically carried out through the outputs 14 to 16 of the shift register 13, which outputs control closing of one of the switches 78, 78' and 78''.

The potentiometer 69 (FIG. 4) is so adjusted that as soon as the amplitude of the dc voltage of each battery cell to be conditioned transmitted on the non-battery inverting input 71 of the comparator 68 through the resistor 72, the capacitor 73, the switch 77, the connection point E, the closed contacts 24, 24' or 24'' drops below 1 volt, a high logic level - low logic level transition of the signal on the output 74 of the comparator 68 is produced. This high-to-low transition stops supplying of a base current to the transistor 81 (FIG. 3) so that the discharge current through the transistors 81 and 82 is also interrupted. The switch 77 is then opened and the non-inverting input 71 becomes grounded through the resistors 72 and 76, and the switch 46.

The potentiometer 69 is therefore so adjusted that a voltage of approximately 4 volts is applied on the inverting input 67 of the comparator 68, as four serially interconnected battery cells are connected between the connectors 1, 2 or 3. A voltage of 1 volt across a 1.2 volt (nominal) AA, C or D battery cell indicates appropriate discharge of such a cell.

The dc voltage produced by the voltage $V_1$ through the voltage divider formed by the resistors 52 and 53 is also applied to the non-inverting input 86 of a comparator 88. Consequently, the high-to-low transition on the output 74 of the comparator 68 applied to the inverting input 89 of the comparator 88 through a resistor 90 produces on the output 91 of this comparator 88 a low logic level - high-logic level transition of the signal produced on this output. The low-to-high transition on the output 91 produces at circuit point 92 a positive pulse due to the action of the capacitor 93 and the resistor 94. The positive pulse at point 92 is applied to the inputs 95 and 96 of the long range timers 60 and 61 to trigger the same. The timers 60 and 61 then start counting of a 14-hour time period. When counting, the two timers produce a low logic level signal on the output line 62, which signal is transmitted to the circuit point 58 through a diode 150, as the switch 57 is at that time open due to the low logic level signals present on the outputs 54 and 74 of the comparators 50 and 68 and applied to the control input of this switch 57 through the diodes 56 and 97. The low logic level signal at point 58 is transmitted through the connection point D to the control input of the electronic switch 35 (see FIG. 2) which opens to allow the charge mode of the cycling device. The inverting input 31 of the comparator 32 is then disconnected from the ground.

As mentioned hereinabove, the high logic level signal on one of the outputs 14 to 16 of the shift register 13 closes one of the electronic switches 38, 38' or 38'' so that a voltage is produced on the non-inverting input 36 of the comparator 32 by the positive dc voltage $V_1$ through the potentiometer 37, 37' or 37'' corresponding to the closed switch 38, 38' or 38'', the closed switch 38, 38' or 38'', and the resistor 39.

In order to allow supplying of a charging current by the adjustable constant direct current source, the output 40 of the comparator 32 (FIG. 2) must present a low logic level signal. Accordingly, the dc voltage at circuit point 98 is automatically brought to an amplitude somewhat higher than that present on the non-inverting input 36 so as to produce on the output 40 of the comparator 32 a low logic level signal. As the adjustment of the potentiometer 37, 37' or 37'' corresponding to the closed switch 38, 38' or 38'' determines the amplitude of the voltage on the non-inverting input 36, it also determines the amplitude of the dc voltage at circuit point 98, the amplitude of the base currents through the transistors 27 and 28, and consequently the amplitude of the charging current. Indeed, the voltage at point 98 produces base currents in the transistors 27 and 28 through the resistor 34. The voltage at circuit point 98 therefore determines the amplitude of these base currents and also the amplitude of the charging current.

The charging current produced through the transistors 27 and 28 connected to the dc source voltage $V_1$ through a resistor 30, is supplied to the battery cells to be conditioned through connection point A, the line 41 of FIG. 3, the connection point B, through the switch contacts 42 (FIG. 1), the resistor 43, and the closed contacts 23.

As can be easily appreciated, the amplitude of the charging current is automatically adjusted in response to the high logic level signal present on one of the outputs 14 to 16 of the shift register 13, which signal controls closure of one of the switches 38, 38' and 38''.

After triggering of the long range timers 60 and 61 in response to the high-to-low transition on the output 74 of the comparator 68, a clock signal in the form of a square wave having a frequency determined by the resistance of a potentiometer 99 and of a resistor 100, and by the capacitance of a capacitor 101, is delivered on an output line 102 of the timer 60. This clock signal also decreases the number displayed by internal counters of the timers. Of course, the frequency of the clock signal determines the time period taken by the internal counters to decrease to 0. In the present case, the frequency of the clock signal is adjusted so that this time period is of 14 hours, which 14-hour time period is suitable to fully charge battery cells of type AA, C or D when an appropriate charging current is supplied thereto.

As soon as the internal counters reach zero, a low logic level - high logic level transition is produced on the output line 62 and transmitted to the circuit point 58, through the diode 150, the switch 57 being open at that time due to the low logic level signal on the comparator outputs 54 and 74. The low-to-high transition on the circuit point 58 is applied to both the inputs 64 and 65 of the timers 60 and 61 to stop counting of the latter and to the control input of the electronic switch 35 (FIG. 2) through the connection point D. The switch 35 then closes and interconnects with the ground of the circuit of the cycling device the input 31 of the comparator 32. Consequently, after the 14-hour period of the charge mode, the cycling device automatically comes back into the trickle mode and remains in this mode until the push button 46 is again depressed. At this moment, the cycling device passes successively into the discharge and charge modes as explained hereinabove, and automatically comes back into the trickle mode.

By conditioning battery cells as explained hereinabove, the cycling device cancels at least some of the problems associated with their general use with lack of care, for example crystal growth, lost of internal contact with the sintered plates, etc. Moreover, as suitable trickle, discharge, and charge currents are automatically selected in relation to the selected type of battery cell, battery cells of different types can be conditioned very efficiently.

In the trickle mode, the high logic level signal at circuit point 58 (FIG. 4) is transmitted through the connection point D to an input 104 (FIG. 2) of a NOR gate 103 having its other input 105 grounded, and the output of this gate 103 supplies to an input 106 of the NOR gate 8 a low logic level signal. The other input 107 of the gate 8 receives through the connection point G the low logic level signal present on the output 74 (FIG. 4) of the comparator 68 so that a high logic level signal is delivered on the output of the gate 8 connected to the input 6 of the contact bounce eliminator 7 through the resistor 9. Consequently, selection of the type of the battery cell to be conditioned is enabled through depression of the push button 4 during the trickle mode of the cycling device.

In the discharge mode of the cycling device, the high logic level signal present at circuit point 58 (FIG. 4) is applied to the input 104 of the gate 103 having its other input 105 grounded, so that the gate 103 supplies to the input 106 of the gate 8 a low logic level signal. As the high logic level signal present on the output 74 of the comparator 68 is applied to the input 107 of the gate 8, the output of the latter delivers a low logic level signal on its output, which output is connected to the input 6 of the eliminator 7 through the resistor 9. Consequently, no selection of the type of battery cell is enabled during the discharge mode of the battery cycler.

In the charge mode of the battery cycler, the low logic level signal present at circuit point 58 is applied to the input 104 of the gate 103 having its other input 105 grounded so that a high logic level signal is produced on the output of the gate 103 and supplied to the input 106 of the NOR gate 8. As the input 107 of the gate 8 receives the low logic level signal present on the output 74 of the comparator 68, a low logic level signal is delivered by the output of the NOR gate 8 connected to the input 6 of the eliminator 7 through the resistor 9. Again, selection of the type of battery cell to be conditioned is not enabled through depression of the push button 4 during the charge mode of the cycling device.

Consequently, selection of the type of battery cell to be conditioned is enabled only during the trickle mode of the cycling device.

As shown on FIG. 3 of the attached drawings, the cycling device further comprises a comparator 108 having a non-inverting input connected to the connection point A through a resistor 109, and an inverting input supplied with a positive dc voltage produced by the voltage $V_1$ through a potentiometer 112.

The voltage applied on the inverting input 111 of the comparator 108 is so selected through adjustment of the potentiometer 112 that a low logic level signal is produced on the output 113 of the comparator 108 as long as a trickle or charging current is delivered to the battery cells to be conditioned, and as long as a discharge current is supplied by these battery cells.

The voltage on the inverting input 111 of the comparator 108 is also so selected that upon opening of the circuit defined by the line 41, the connection point B, the switch contacts 42, the resistor 43, the closed contacts 23, the battery cells to be conditioned and the fuse 44, the voltage applied on the non-inverting input 110 of the comparator 108 by the dc voltage $V_1$ through a resistor 114 and the above-mentioned resistor 109 produces on the output 113 a high logic level signal which supplies a LED 115. The current through the LED 115 is limited by a resistor 116 connected between the ground and the cathode of this LED 115. Consequently, opening of the above-mentioned circuit which interrupts the trickle, discharge or charging current is immediately indicated through the LED 115.

The cycling device is further provided with a "fail safe" circuit illustrated on FIG. 1 of the attached drawings.

The "fail safe" circuit includes a comparator 117 having a non-inverting input 118 connected to a first terminal of the resistor 43 through a resistor 120, and an inverting input 119 connected to the second terminal of the resistor 43 through a resistor 121 and switch contacts 122.

When a trickle current is supplied to the battery cells to be conditioned, a positive dc voltage is produced through the resistor 43, having advantageously a resistance of 1 ohm, which dc voltage is applied between the inputs 118 and 119 of the comparator 117 which produces on its output 123 a high logic level signal. Terminals 151 permit external measurement of the voltage across the resistor 43. As during the trickle mode, the output line 102 of the timer 60 (FIG. 4), connected to the control input of an electronic switch 124 through connection point H, has a high impedance, a high logic level signal is applied by the voltage $V_1$ to the control input of the switch 124 through a resistor 129. The electronic switch 124 is then closed and the high logic level signal present on the output 123 of the comparator 117 supplies a LED 125 through a diode 126, a current-limiting resistor 127, the closed switch 124 and switch contacts 128. Steady lighting of the LED 125 therefore indicates that a trickle current is supplied to the battery cells.

When a discharge current is supplied by the battery cells through the resistor 43, a negative dc voltage is produced across the resistor 43, which negative voltage is applied between the inputs 118 and 119 of the comparator 117. A low logic level signal is therefore delivered on the output 123 of the latter comparator. As in the discharge mode of the battery cycler, the high logic level signal present on the output 74 of the comparator 68 closes the switch 57 (FIG. 4) the positive dc voltage $V_1$ supplies a LED 130 (FIG. 1) through the switch 57, the connection point K, switch contacts 133, a current limiting resistor 131 and a diode 132. Steady lighting of the LED 130 therefore indicates supplying of a discharge current by the battery cells, i.e. the discharge mode of the cycling device.

It can be easily appreciated that the LED 130 is energized only if both the discharge current is detected through the resistor 43, and the electronic switch 57 is closed by the high logic level signal present on the output 74 of the comparator 68 (discharge logic conditions). False indication of the discharge mode of the cycling device is thereby prevented.

When a charging current is supplied to the battery cells to be conditioned, a positive dc voltage is produced across the resistor 43, which positive voltage is applied between the inputs 118 and 119 of the comparator 117 which produces on its output 123 a high logic level signal. As during the charge mode of the battery cycler, the clock signal in the form of a square wave is supplied on the output line 102 of the long range timer 60 and transmitted to the control input of the electronic switch 124 through the connection point H, the switch 124 is alternatively opened and closed. As it is intermittently energized by the high logic level signal present on the output 123 of the comparator 117, the LED 125 flashes to indicate the charge mode of the cycling device. Of course, the clock signal from the output line 102 (FIG. 4) has a frequency low enough to cause flashing of the LED 125 which can be easily seen by the operator.

As can be appreciated, the LED 125 flashes only if, simultaneously, a charging current is detected through the resistor 43, a clock signal is generated on the output line 102 (FIG. 4) to indicate operation of the timers 60 and 61, and the charge logic conditions (the low logic level signal present on the output 74 of the comparator 68) are present. If a high logic level signal is produced on the output 74 of the comparator 68, the transistors 81 and 82 are conductive so that no current can be supplied to the cells through the resistor 43 and the comparator output 123 is low. False indication of the charge mode through flashing of the LED 125 is thereby prevented.

The cycling device is also provided with a circuit for testing the charge of the conditioned battery cells. As the contacts 42, 122, 128 and 133 form part of a single switch in which the movable contacts (shown by arrows) are mechanically interconnected together as shown on FIG. 1 by the dotted line 134, these movable contacts can be simultaneously displaced from their position shown in FIG. 1 to their test positions shown in FIG. 1 by the letter T. The conditioned battery cells of the selected type then supply through the corresponding, closed contacts 23, the resistor 43 and the switch contacts 42, a dc current to a test resistor 135. If the dc voltage generated across the test resistor 135 and transmitted on the non-inverting input 118 of the comparator 117 through the resistor 120 is greater than the dc voltage supplied to the inverting input 119 by the voltage $V_1$ through a potentiometer 136, the switch contacts 122 and the resistor 121, a high logic level signal is produced on the output 123 of the comparator 117, which signal supplies through the diode 126, a resistor 137 and the contacts 128 a LED 138 to indicate full charge of the battery cells. The potentiometer 136 through which a dc voltage is supplied to the input 119 of the comparator 117 is so adjusted that a voltage equal to or greater than 1.36 volt per cell (which corresponds to a full charge of a battery cell of the type AA, C or D) will produce on the output 123 a high logic level signal, while a voltage lower than 1.36 volt per cell will produce on the output 123 a low logic level signal. In the latter case, a LED 139 is supplied by the conditioned battery cells through the corresponding, closed contacts 23, the resistor 43, the contacts 42 and a current limiting resistor 140. Lighting of the LED 138 therefore indicates full charge of the battery cells while lighting of the LED 139 indicates uncertain state of the charge of the battery cells.

It should be noted here that the charging current is selected for each type of battery cell so that the battery cells are fully charged at the end of the 14-hour time period of charge.

Although the present invention has been described hereinabove by way of a preferred embodiment thereof, it should be pointed out that any modification to this preferred embodiment within the scope of the appended claims is not deemed to change or alter the nature of the present invention.

What is claimed is:

1. A battery cell charging device comprising:
   means for connecting battery cells of different types to said charging device;
   means for generating charging currents of different amplitudes, each charging current amplitude being suitable to charge one type of battery cell; and
   means for selecting the type of at least one battery cell of one type to be charged, said at least one battery cell being connected to the charging device through the connecting means, and said cell type selecting means comprising means for producing an output signal indicative of the selected type of battery cell;
   said charging current generating means comprising means for automatically selecting, in response to said indicative output signal, one of the charging currents having the amplitude suitable to charge the selected type of battery cell, and means for supplying said selected charging current to said at least one battery cell in order to charge the latter; and
   said charging current supplying means comprising an adjustable constant current source with feedback, including (a) a first PNP transistor having a base, a collector, and an emitter connected to a voltage source through a first resistor, (b) a second PNP transistor having an emitter connected to the base of the first transistor, a collector connected to the collector of the first transistor, and a base, and (c) a comparator having an output connected to the base of the second transistor through a second resistor, an inverting input connected to the emitter of the first transistor through a third resistor, and a non-inverting input to which a control signal is applied.

2. A battery cell charging device according to claim 1, further comprising timing means for interrupting the selected charging current after the latter current has been supplied to said at least one battery cell during a predetermined period of time, the amplitude of the selected charging current and the predetermined period of time being so adjusted that said at least one battery cell is fully charged at the end of said predetermined period of time.

3. A battery cell charging device according to claim 1, wherein said at least one battery cell is a plurality of serially interconnected battery cells of one type.

4. A battery cell charging device according to claim 1, wherein said cell type selecting means comprises a plurality of outputs each corresponding to one type of battery cell, said indicative output signal being delivered on the output of said cell type selecting means corresponding to said selected type of battery cell, and wherein said charging current selecting means comprises:
control voltage generating means for producing control voltages of different amplitudes; and
a plurality of electronic switches each having a control input connected to one of said outputs of the cell type selecting means, so that delivering of said indicative output signal on one of said outputs of the cell type selecting means causes closure of the electronic switch having its control input connected to the latter output to connect one of said control voltages to the non-inverting input of said comparator, which control voltage having an amplitude required to adjust the charging current to the amplitude suitable to charge the selected type of battery cell.

5. A battery cell charging device comprising:
means for connecting battery cells of different types to said charging device;
means for generating charging currents of different amplitudes, each charging current amplitude being suitable to charge one type of battery cell; and
means for selecting the type of at least one battery cell of one type to be charged, said at least one battery cell being connected to the charging device through the connecting means, and said cell type selecting means comprising means for producing an output signal indicative of the selected type of battery cell;
said charging current generating means comprising means for automatically selecting, in response to said indicative output signal, one of the charging currents having the amplitude suitable to charge the selected type of battery cell, and means for supplying said selected charging current to said at least one battery cell in order to charge the latter;
said charging current supplying means comprising an adjustable constant current source;
said cell type selecting means comprising a plurality of outputs each corresponding to one type of battery cell, said indicative output signal being delivered on the output of said cell type selecting means corresponding to the selected type of battery cell; and
said charging current selecting means comprising a plurality of controllable switches each having a control input connected to one of said outputs of the cell type selecting means, so that delivering of said indicative output signal on one of the outputs of said cell type selecting means closes the switch having its control input connected to the latter output to cause the adjustable constant current source to supply a charging current having the amplitude suitable to charge said at least one battery cell of the selected type.

6. A battery cell charging device comprising:
means for connecting battery cells of different types to said charging device;
means for generating charging currents of different amplitudes, each charging current amplitude being suitable to charge one type of battery cell; and
means for selecting the type of at least one battery cell of one type to be charged, said at least one battery cell being connected to the charging device through the connecting means, and said cell type selecting means comprising means for producing an output signal indicative of the selected type of battery cell;
said charging current generating means comprising means for automatically selecting, in response to said indicative output signal, one of the charging currents having the amplitude suitable to charge the selected type of battery cell, and means for supplying said selected charging current to said at least one battery cell in order to charge the latter; and
said battery cell connecting means comprising a plurality of connectors for receiving battery cells of different types, and means responsive to the indicative output signal from the cell type selecting means to connect to the charging device the connectors associated with the selected type of battery cell.

7. A cycling device for conditioning battery cells, comprising:
means for connecting battery cells of different types to said cycling device;
load means for causing discharge currents of different amplitudes, each discharge current amplitude being suitable to discharge one type of battery cell;
means for generating charging currents of different amplitudes, each charging current amplitude being suitable to charge one type of battery cell;
means for selecting the type of at least one battery cell of one type to be conditioned, said at least one battery cell being connected to the cycling device through the connecting means, and said cell type selecting means comprising means for producing an output signal indicative of the selected type of battery cell;
said load means comprising means for automatically selecting, in response to said indicative output signal, one of said discharge currents having the amplitude suitable to discharge the selected type of battery cell, and means for causing said at least one battery cell to supply the selected discharge current in order to discharge said at least one battery cell;
said charging current generating means comprising means for automatically selecting, in response to said indicative output signal, one of said charging currents having the amplitude suitable to charge the selected type of battery cell, and means for supplying the selected charging current to said at least one battery cell to charge the latter; and
means for controlling the load means and the charging current generating means to cause in sequence supply by said at least one battery cell of the selected discharge current, and supply of the selected charging current to said at least one battery cell; and
said cell type selecting means comprising a plurality of outputs each corresponding to one type of battery cell, said indicative output signal being supplied on the output of the cell type selecting means corresponding to the selected type of battery cell.

8. The cycling device of claim 7, further comprising:
means for generating trickle currents of different amplitudes, each trickle current amplitude being suitable to hold the charge of one type of battery cell;
said trickle current generating means comprising means for automatically selecting, in response to said indicative output signal, one of said trickle currents having the amplitude suitable to hold the charge of the selected type of battery cell, and means for supplying the selected trickle current to said at least one battery cell in order to hold the charge of the latter; and said controlling means further comprising means for controlling the trickle current generating means so as to cause in sequence supply of the selected trickle current to said at least one battery cell, supply by said at least one battery cell of the selected discharge current, and supply of the selected charging current to said at least one battery cell.

9. The cycling device of claim 8, wherein said trickle current supplying means comprises an adjustable constant current source including a transistor having a base connected to a reference voltage through said trickle current selecting means, said trickle current selecting means comprising:

a plurality of sets connected in parallel, each including a controllable switch and a resistive element connected in series, and interposed between the base of said transistor and the reference voltage, each switch including a control input connected to one of the outputs of the cell type selecting means so that delivering of said indicative output signal on one of the outputs of the cell type selecting means causes closure of the switch having its control input connected to the latter output, a control, base current determined by the resistance of the resistive element of the set including the closed switch being supplied to the base of said transistor, the resistance of the resistive element connected in series with the closed switch being so selected that said base current has an amplitude which causes said trickle current supplying means to supply to said at least one battery cell a trickle current having the amplitude suitable to hold the charge of said at least one battery cell.

10. The cycling device of claim 7, wherein said controlling means comprises timing means for interrupting the selected charging current after the latter current has been supplied to said at least one battery cell during a predetermined period of time, the amplitude of the selected charging current and the predetermined period of time being so adjusted that said at least one battery cell is fully charged at the end of said predetermined period of time.

11. The cycling device of claim 9, wherein said cell type selecting means further comprises a push button, and means for sequentially delivering a logic signal on the outputs of said cell type selecting means in response to depressions of the push button, said logic signal constituting said signal indicative of the selected type of battery cell.

12. The cycling device of claim 7, wherein said load means comprises a set of transistors through which flow the discharge current supplied by said at least one battery cell, and wherein said discharge current selecting means comprises means for adjusting the amplitude of a control, base current supplied to said set of transistors so as to adjust the amplitude of the discharge current supplied by said at least one battery cell through said set of transistors.

13. The cycling device of claim 12, in which said base current adjusting means comprises:

a source voltage; and a plurality of sets connected in parallel, each including a controllable switch and a resistive element connected in series, and interposed between the source voltage and said set of transistors, each switch having a control input connected to one of said outputs of the cell type selecting means so that delivering of said indicative output signal on one of the outputs of the cell type selecting means causes closure of the switch having its control input connected to the latter output;

said source voltage supplying the control, base current to said set of transistors through the closed switch and the resistive element of the same set, the control, base current having an amplitude determined by the resistance of the resistive element connected in series with the closed switch, which resistance is adjusted so as to cause supply by said at least one battery cell of a discharge current having the amplitude suitable to discharge said at least one battery cell.

14. The cycling device of claim 7, wherein said controlling means comprises:

a push button;

means for controlling said load means so as to cause supply by said at least one battery cell of the selected discharge current in response to depression of said push button;

means for measuring the voltage across said at least one battery cell; and means for controlling said load means so as to interrupt the selected discharge current when said voltage across said at least one battery cell has reduced to a predetermined lower amplitude; and means for controlling said charging current generating means so as to cause supply of the selected charging current to said at least one battery cell when the voltage across said at least one battery cell has reduced to the predetermined lower amplitude.

15. A cycling device for conditioning battery cells, comprising:

means for connecting battery cells of different types to said cycling device;

load means for causing discharge currents of different amplitudes, each discharge current amplitude being suitable to discharge one type of battery cell;

means for generating charging currents of different amplitudes, each charging current amplitude being suitable to charge one type of battery cell;

means for selecting the type of at least one battery cell of one type to be conditioned, said at least one battery cell being connnected to the cycling device through the connecting means, and said cell type selecting means comprising means for producing an output signal indicative of the selected type of battery cell;

said load means comprising means for automatically selecting, in response to said indicative output signal, one of said discharge currents having the amplitude suitable to discharge the selected type of battery cell, and means for causing said at least one battery cell to supply the selected discharge current in order to discharge said at least one battery cell;

said charging current generating means comprising means for automatically selecting, in response to said indicative ouput signal, one of said charging currents having the amplitude suitable to charge the selected type of battery cell, and means for supplying the selected charging current to said at least one battery cell to charge the latter;

means for controlling the load means and the charging current generating means to cause in sequence supply by said at least one battery cell of the selected discharge current, and supply of the selected charging current to said at least one battery cell;

said battery cell connecting means comprising a plurality of connectors for receiving battery cells of different types, and means responsive to the indicative output signal from the cell type selecting means for connecting to the cycling device the connectors associated with the selected type of battery cell.

16. A battery cell charging device, comprising:

means for connecting at least one battery cell to the charging device;

means for supplying a charging current to said at least one battery cell in order to charge the latter;

timing means for interrupting the charging current after said current has been supplied to said at least one battery cell during a predetermined period of time, said timing means including means for producing a first output signal indicating operation thereof;

means for detecting the charging current, which detecting means comprising means for producing a second output signal upon detection of said charging current; and means for indicating proper battery cell charging operation of the charging device only in response to both said first and second output signals, so that proper battery cell charging operation is indicated only when said timing means are operating and said charging current is detected;

said indicating means comprising means for producing a supply voltage in response to said second output signal, and a light-emitting diode supplied by said supply voltage through a switching element provided with a control input, and said first output signal being a clock signal applied to the control input of the switching element to alternatively close and open said switching element, so that the light-emitting-diode flashes when both the charge current is detected and said clock signal is produced.

17. The battery cell charging device according to claim 16, in which said charging current detecting means comprises a resistive element having two terminals and through which the charging current flows so that a voltage drop proportional to the charging current is generated across the resistive element, and in which said supply voltage producing means comprises a comparator having two inputs respectively connected to the two terminals of the resistive element, and an output on which a high logic level signal is produced in response to the voltage drop generated across the resistive element, which high logic level signal constitutes said supply voltage.

18. A cycling device for conditioning at least one battery cell, comprising:

means for connecting said at least one battery cell to the cycling device;

means for supplying a trickle current to said at least one battery cell in order to hold the charge of the latter;

load means for causing said at least one battery cell to supply a discharge current so as to discharge said at least one battery cell;

means for supplying a charging current to said at least one battery cell in order to charge the latter;

means for controlling said trickle current supplying means, said load means and said charging current supplying means to cause in sequence supply of the trickle current to said at least one battery cell, supply by said at least one battery cell of the discharge current and supply of the charging current to said at least one cell, said controlling means comprising means for producing discharge logic conditions to cause supply by said at least one battery cell of the discharge current, means for producing charge logic conditions to cause supply of the charging current to said at least one battery cell, and timing means for interrupting the charging current after the said charging current has been supplied to said at least one battery cell during a predetermined period of time, said timing means including means for producing a first output, clock signal indicating operation thereof;

means for detecting said trickle current and for producing a second output signal upon detection of said trickle current;

means for detecting the discharge current, and for producing a third output signal upon detection of said discharge current;

means for detecting the charging current and for producing a fourth output, supply signal upon detection of said charging current;

said trickle, discharge and charging current detecting means comprising (a) a resistive element having two terminals and through which the trickle, discharge and charging currents flow so that a voltage drop proportional to the trickle, discharge or charging current is generated across the resistive element, and (b) a comparator having two inputs respectively connected to the two terminals of the resistive element, and an output for delivering said second, third and fourth output signals in response to the voltage drop across the resistive element which is applied between the two inputs of said comparator;

means for indicating supply of said trickle current to said at least one battery cell in response to said second output signal;

means for indicating proper battery cell discharge operation of the cycling device only when both said third output signal and said discharge logic conditions are produced; and means for indicating proper battery cell charge operation of the cycling device only when, simultaneously, said first output, clock signal, said fourth output signal, and said charge logic conditions are produced, said battery cell charge operation indicating means comprising a light-emitting diode supplied by said fourth output, supply voltage through a switching element provided with a control input, and said first output, clock signal being applied to the control input of the switching element to alternatively close and open said switching element, so that the light-emitting-diode flashes.

19. A battery cell charging device comprising:

means for connecting at least one battery cell to the charging device;

means for supplying a charging current to said at least one battery cell through a charge circuit in order to charge said at least one battery cell;

means for detecting opening of said charge circuit which detecting means comprising (a) a resistor having a first terminal connected to a point of said charge circuit and a second terminal connected to a voltage source, and (b) a comparator having a first input connected to said point of the charge circuit, a second input on which is applied a reference voltage, and an output for delivering an output signal upon opening of said charge circuit; and an indicator responsive to the output signal from the comparator to indicate opening of the charge circuit.

20. A cycling device for conditioning at least one battery cell, comprising:

means for connecting said at least one battery cell to said cycling device;

means for causing in sequence supply through an electric circuit of a discharge current by said at least one battery cell in order to discharge the same, and supply through the said electric circuit of a charging current to said at least one battery cell in order to charge the latter;

means for detecting opening of said electric circuit, said detecting means comprising (a) a resistor having a first terminal connected to a point of said electric circuit and a second terminal connected to a voltage source, and (b) a comparator having a first input connected to said point of the electric circuit, a second input to which is applied a reference voltage, and an output for delivering an output signal upon opening of the said circuit; and an indicator responsive to the output signal from said comparator to indicate opening of the electric circuit.

21. A cycling device for conditioning at least one battery cell, comprising:

means for connecting said at least one battery cell to said cycling device;

means for causing in sequence supply through an electric circuit of a trickle current to said at least one battery cell in order to hold the charge of the latter, supply through the electric circuit of a discharge current by said at least one battery cell in order to discharge the same, and supply through the said electric circuit of a charging current to said at least one battery cell in order to charge the latter;

means for detecting opening of said electric circuit, said detecting means comprising (a) a resistor having a first terminal connected to a point of said electric circuit and a second terminal connected to a voltage source, and (b) a comparator having a first input connected to said point of the electric circuit, a second input to which is applied a reference voltage, and an output for delivering an output signal upon opening of the said circuit; and an indicator responsive to the output signal from said comparator to indicate opening of the electric circuit.

22. A cycling device for conditioning battery cells, comprising:

means for connecting battery cells of different types to said cycling device;

means for generating trickle currents of different amplitudes, each trickle current amplitude being suitable to hold the charge of one type of battery cell;

load means for causing discharge currents of different amplitudes, each discharge current amplitude being suitable to discharge one type of battery cell;

means for generating charging currents of different amplitudes, each charging current amplitude being suitable to charge one type of battery cell;

means for selecting the type of at least one battery cell of one type to be conditioned, said at least one battery cell being connected to the cycling device through the connecting means, and said cell type selecting means comprising means for producing an output signal indicative of the selected type of battery cell;

said trickle current generating means comprising means for automatically selecting, in response to said indicative output signal, one of said trickle currents having the amplitude suitable to hold the charge of the selected type of battery cell, and means for supplying the selected trickle current to said at least one battery cell in order to hold the charge of the latter;

said load means comprising means for automatically selecting, in response to said indicative output signal, one of said discharge currents having the amplitude suitable to discharge the selected type of battery cell, and means for causing said at least one battery cell to supply the selected discharge current in order to discharge said at least one battery cell;

said charging current generating means comprising means for automatically selecting, in response to said indicative output signal, one of said charging currents having the amplitude suitable to charge the selected type of battery cell, and means for supplying the selected charging current to said at least one battery cell to charge the latter; and means for controlling the trickle current generating means, the load means and the charging current generating means so as to cause in sequence supply of the selected trickle current to said at least one battery cell, supply by said at least one battery cell of the selected discharge current, and supply of the selected charging current to said at least one battery cell, said controlling means comprising means for producing trickle mode logic conditions and for permitting selection of the type of battery cell through the cell type selecting means only when said trickle mode logic conditions are produced.

* * * * *